(12) United States Patent
Tanabe et al.

(10) Patent No.: US 7,869,148 B2
(45) Date of Patent: Jan. 11, 2011

(54) IMAGING APPARATUS

(75) Inventors: Masaki Tanabe, Kyoto (JP); Hirohiko Ina, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/532,864

(22) PCT Filed: Mar. 27, 2008

(86) PCT No.: PCT/JP2008/000752

§ 371 (c)(1),
(2), (4) Date: Sep. 24, 2009

(87) PCT Pub. No.: WO2008/126361

PCT Pub. Date: Oct. 23, 2008

(65) Prior Publication Data

US 2010/0103541 A1    Apr. 29, 2010

(30) Foreign Application Priority Data

Mar. 30, 2007    (JP) .............................. 2007-093276

(51) Int. Cl.
G02B 7/02    (2006.01)
G02B 15/14    (2006.01)
(52) U.S. Cl. .................. 359/823; 359/700; 359/701
(58) Field of Classification Search ......... 359/694–704, 359/811–824, 830, 554, 557; 348/374, 208.2; 396/529, 133, 535, 52, 55, 541
See application file for complete search history.

(56) References Cited

U.S. PATENT DOCUMENTS 7,670,071 B2 *    3/2010    Cheng et al. ................ 396/529

7,804,645 B2 *    9/2010    Morita et al. ................ 359/554
2010/0027139 A1 *    2/2010    Terada ......................... 359/823

FOREIGN PATENT DOCUMENTS

| JP | 10-177130 A | 6/1998 |
|---|---|---|
| JP | 2000-193871 A | 7/2000 |
| JP | 2005-107439 A | 4/2005 |
| JP | 2005-128578 A | 5/2005 |
| JP | 2006-030893 A | 2/2006 |
| JP | 2006-209032 A | 8/2006 |

OTHER PUBLICATIONS

International Search Report for PCT/JP2008/000752.

* cited by examiner

*Primary Examiner*—Mohammed Hasan
(74) *Attorney, Agent, or Firm*—Pearne & Gordon LLP

(57) ABSTRACT

An imaging apparatus includes of a lens holder arranged concentrically with an imaging element; a lens barrel having an imaging lens removably inserted from the leading end section side of the lens holder; a cover removably fitted at the leading end section of the lens holder; and a cam mechanism section arranged on the barrel, the lens holder and the cover so that the barrel turns around the optical axis to the imaging element and that the barrel moves in the optical axis direction. The cam mechanism section includes a first cam surface formed on the inner circumference surface of the lens holder; a cam protruding section formed on the outer circumference surface of the lens barrel; and a second cam surface formed on the inner surface of the cover. The cam mechanism section smoothly turns the barrel around the optical axis and moves the barrel in the optical axis direction.

2 Claims, 2 Drawing Sheets

IMAGING APPARATUS

TECHNICAL FIELD

The present invention relates to an imaging apparatus having a cam mechanism to adjust the focusing from an object at a short distance to that at the infinity; which imaging apparatus being incorporated in, for example, a portable telephone unit with built-in camera.

BACKGROUND ART

A conventional imaging apparatus in this category made known by Patent Document 1 has a substrate on which an imaging element is mounted, and a lens holder arranged to surround the imaging element concentrically. It further includes a lens barrel (lens holder) which is helically fitted with the inner surface of lens holder so as to be able to turn around the optical axis with respect to the imaging element, and the lens barrel moves along the direction of optical axis by such turning. An imaging lens is fitted in the inside of the lens barrel to have the image of an object focused on the imaging element.

The lens barrel and the lens holder are provided, respectively, with screwed arrangements; focusing is adjusted by turning the lens barrel.

Patent Document 2 discloses an elastic member for preventing rattling of the lens barrel fitted with imaging lens in the optical axis direction. The elastic member is a sort of spring washer, which shows a ring-shape when viewed from the above, while at the side view a waving form.

In the imaging apparatus as disclosed in Patent Document 1, however, screwed arrangements have to be provided on both the lens barrel and the lens holder. This implies an increased cost for die making. Furthermore, in the assembly stage of coupling the lens holder and the lens barrel together, an operator has to turn the lens holder and/or the lens barrel. This type of operation is an adverse factor for the improvement of manufacturing productivity.

As to the imaging apparatus disclosed in Patent Document 2, it necessitates an elastic member for preventing a rattling with the lens barrel moving in the optical axis direction. This means that a certain space for the elastic member has to be provided in the optical axis direction; this is a factor against the ongoing effort for further downsizing and slimming. The number of piece parts counts also increases.

Patent Document 1: Japanese Patent Unexamined Publication No. 2005-128578
Patent Document 2: Japanese Patent Unexamined Publication No. 2006-30893

SUMMARY OF THE INVENTION

The present invention aims to offer an imaging apparatus in which a lens barrel can turn smoothly around the optical axis and move also in the direction of optical axis smoothly. Furthermore, the imaging apparatus can be designed to fulfill the request for further downsizing and slimming, and can be manufactured easily at low cost.

An imaging apparatus in the present invention includes a substrate on which an imaging element is mounted, a lens holder arranged to surround the imaging element with the inner circumference surface at the substrate side to be concentric with the imaging element, a lens barrel inserted detachable from the leading end section side of lens holder to be concentric with the imaging element, an imaging lens fitted in the lens barrel for focusing the image of an object on the imaging element, a cover having an opening formed to surround the top end part of lens barrel removably fitted at the leading end section side of lens holder, and a cam mechanism section arranged on the lens barrel, the lens holder and the cover for turning the lens barrel around the optical axis with respect to the imaging element and moving the lens barrel in the optical axis direction by such turning. The cam mechanism section is composed of a first cam surface formed in a link shape on the inner circumference surface of the lens holder, a cam protruding section formed on the outer circumference surface of the lens barrel moving along the first cam surface, and a second cam surface formed on the inner surface of the cover so as there is such a gap provided against the first cam surface that is slightly smaller than the width of the cam protruding section.

Since the gap size provided between the first cam surface and the second cam surface is smaller than that of cam protruding section in the above-configured mechanism, the second cam surface gives a pressing force to the cam protruding section when the cover is attached to the lens holder. Thus the lens barrel turns and moves under the state where the cam protruding section is having a pressure, and the lens barrel can be adjusted to a certain position smoothly with least rattling. An imaging apparatus in the present invention has a simple structure that is suitable to downsizing and slimming, and can be manufactured at low cost.

The second cam surface in the present invention is provided at three places with an equal interval among each other.

In this way, the cam protruding section of lens barrel is supported at three locations; so, the lens barrel can move easily along the optical axis direction in a stable manner.

REFERENCE MARKS IN THE DRAWINGS

1 Substrate
2 Imaging Element
3 Lens Holder
3a Position Setting Section
3b Catch
4 Lens Barrel
4a Lower Cylindrical Part
4b Upper Cylindrical Part
5 Imaging Lens
6 Cover
6a Cover Top
6b Side Plate
7 Opening
8 Cut for Coupling
9 Catch Space
10 Cam Mechanism Section
10a First Cam Surface
10b Cam Protruding Section
10c Second Cam Surface
11 Infrared-Ray Cut Filter
12 First Frame 13 Second Frame
14 Aperture Plate
15 Aperture
H Gap

DETAILED DESCRIPTION OF PREFERRED EMBODIMENT

An exemplary embodiment of the present invention is described below, referring to FIG. 1 through FIG. 3.

Figure 1:
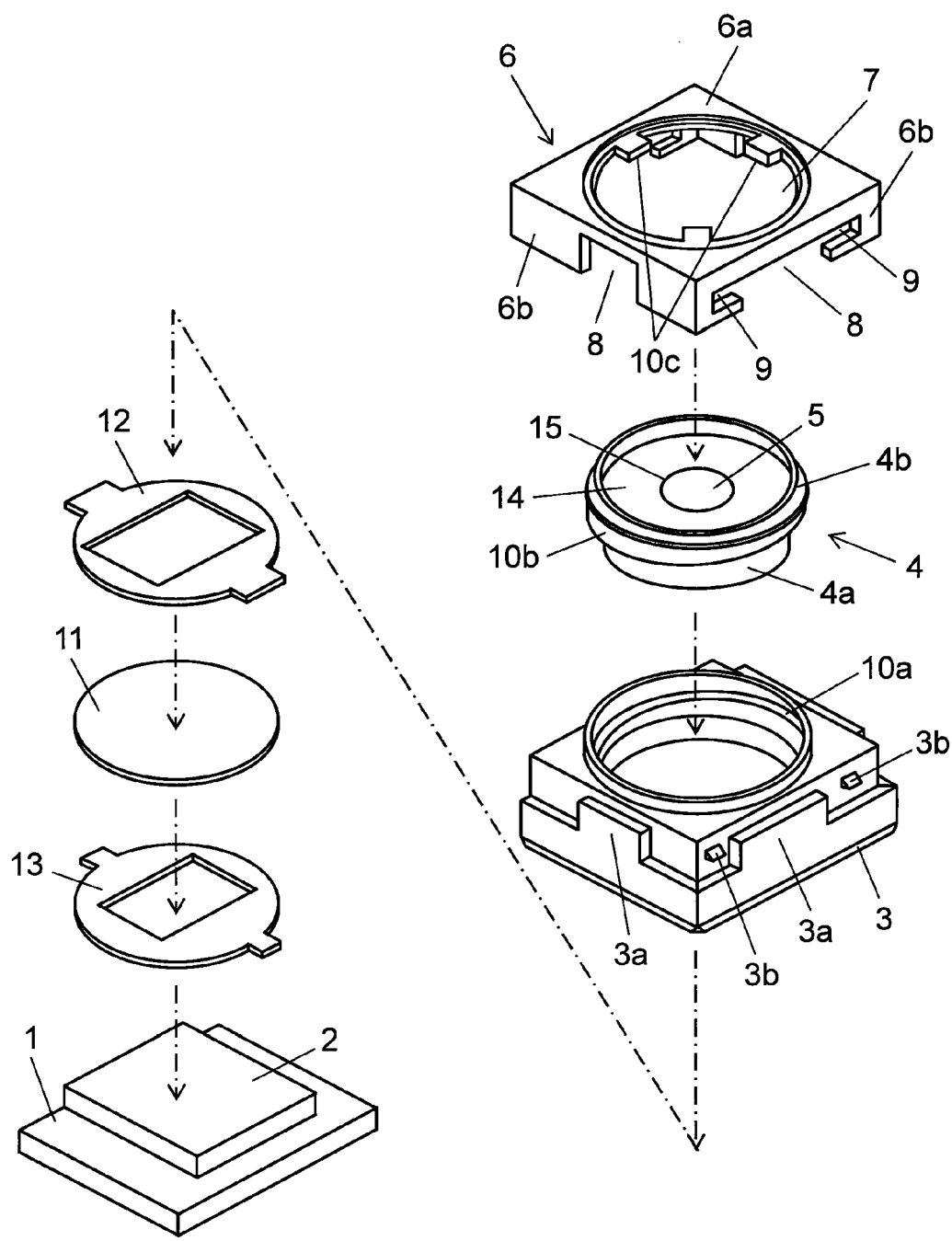
FIG. 1 shows an exploded perspective view of an imaging apparatus in accordance with an exemplary embodiment of the present invention.
Figure 2:
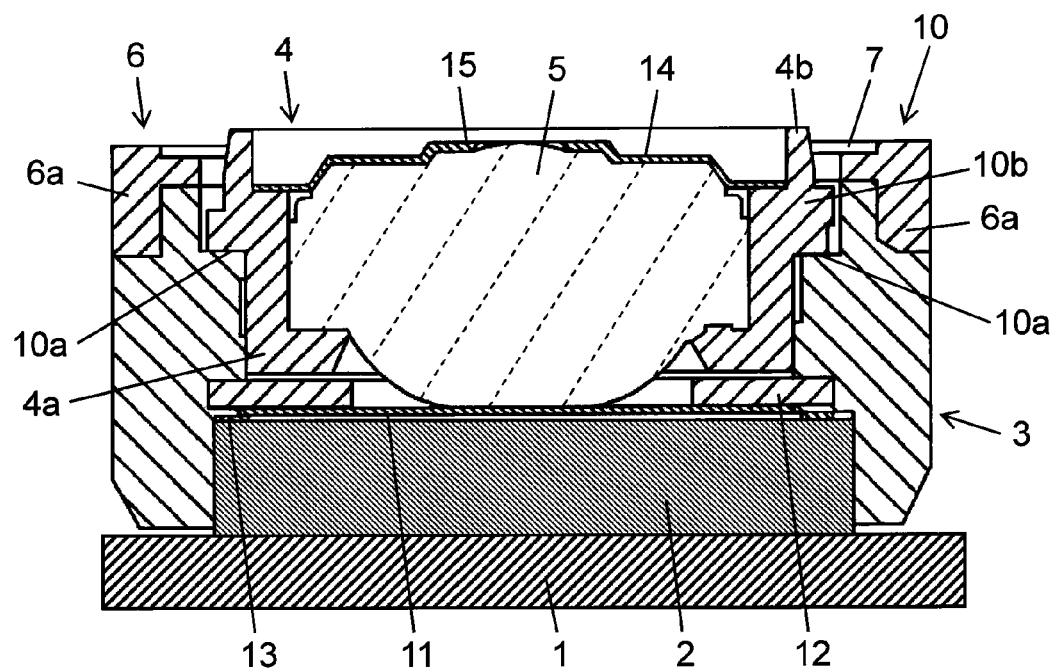
FIG. 2 shows a cross sectional side view of an imaging apparatus assembled in accordance with an exemplary embodiment of the present invention.

As shown in FIG. 1 and FIG. 2, an imaging apparatus in accordance with the present embodiment includes substrate 1 on which imaging element 2 is mounted, lens holder 3 surrounding the imaging element 2 with the inner circumference surface at the substrate side (the side opposite to an imaging object) concentrically to imaging element 2. Further, lens barrel 4 is inserted detachable from the leading end side (the side at an imaging object) of lens holder 3 concentrically to imaging element 2. Imaging lens 5 is affixed in lens barrel 4 to have the image of an object focused on imaging element 2. Cover 6 having opening 7 surrounding an end part of lens barrel 4 is fitted removably to lens holder 3 at the leading end section side. And, cam mechanism section 10 is arranged on lens barrel 4, lens holder 3 and cover 6 so as lens barrel 4 turns around the optical axis to imaging element 2 and lens barrel 4 moves in the direction of optical axis by such turning. Imaging element 2 is made of CCD, CMOS or the like optical elements (not shown).

Lens holder 3 has an approximate cubic shape. Each of the pair of side surfaces opposing to each other is provided with position setting section 3a, and catch 3b is pushing out from an area at both sides of position setting section 3a.

Lens barrel 4 is formed of lower cylindrical part 4a extending downward; cam protruding section 10b, which being a constituent item of the cam mechanism section, protruding from the outer circumference surface of lower cylindrical part 4a forming a link; and upper cylindrical part 4b having a greater diameter and a shorter length as compared to those of lower cylindrical part 4a.

Infrared-ray cut filter (IR filter) 11, which is sandwiched by first frame 12 and second frame 13, is disposed between imaging element 2 and lens barrel 4, in order to protect the light sensing area of imaging element 2 from the infrared-ray incidental to it. Aperture plate 14 is provided horizontally at the imaging object side of imaging lens 5 so as the optical axis coincides with the center of aperture 15 formed concentric to lens barrel 4.

Cover 6 has cover top 6a of square shape, as viewed from the top, provided with opening 7, and side plates 6b which come down from each of the sides of cover top 6a. Side plates 6b are provided with cut for coupling 8 at the location which corresponds to position setting section 3a of lens holder 3. And, catch space 9 is provided at the place which corresponds to catch 3b. These are for coupling/decoupling of the cover and the lens holder.

Cam mechanism section 10 is composed of first cam surface 10a, cam protruding section 10b and second cam surface 10c. First cam surface 10a is provided along the inner circumference surface of lens holder 3 in a link shape, presenting an undulation arrangement corresponding to one round of the inner circumference surface. In other words, when lens holder 3 is unrolled by 360 degrees, first cam surface 10a makes itself a slope of a rectangular triangle, the rectangular triangle representing the undulation corresponding to one round of inner circumference surface. Cam protruding section 10b is a protrusion provided tapered on the outer circumference surface of lens barrel 4 for one round, the protrusion moving along the undulation of first cam surface 10a. Second cam surface 10c is coming out from the inner surface of cover 6 towards inside of the radius; it is provided so as there will be such a small gap H against first cam surface 10a that is slightly smaller than the size of cam protruding section 10b. Second cam surface 10c is provided at the inner surface of cover 6 for three locations with an interval of 120 degrees among each other. These three second cam surfaces 10c have different thickness in the optical axis direction, respectively, so as each of them makes pressure-contact to the tapered cam protrusion section 10b at three places.

Lens barrel 4 is disposed in lens holder 3 with the lower surface of cam protruding section 10b having contact with first cam surface 10a, so as lens barrel 4 can turn around the optical axis and move in the optical axis direction. The undulation of first cam surface 10a is for moving lens barrel 4 to and fro in the optical axis direction. When lens barrel 4 is turned, cam protruding section 10b moves in line with the undulation for focus adjustment.

Namely, first cam surface 10a and second cam surface 10c play the role of female screw while cam protruding section 10b works as male screw. In the course of turning lens barrel 4 for one round, imaging lens 5 moves for a certain specific distance along the optical axis to have the focusing adjusted.

Now, procedure of assembling the piece parts into an imaging apparatus is described. In the first place, mount imaging element 2 on substrate 1. Then, affix infrared-ray filter 11, which is supported with first frame 12 and second frame 13, from the imaging element 2 side, covering the central opening of lens holder 3. And then, glue the base section (the section opposite to imaging object) of lens holder 3 having infrared-ray filter 11 onto substrate 1, so as imaging element 2 is surrounded by the inner circumference surface at an open end of lens holder 3 at the substrate side.

Affix imaging lens 5 to lens barrel 4, and then insert lens barrel 4 into lens holder 3 along the optical axis direction, from the leading end section side. Now, the lower surface (the surface at imaging element side) of cam protruding section 10b of lens barrel 4 makes contact on first cam surface 10a of lens holder 3. Put aperture plate 14 from the imaging object side (from the above, in the drawing) to have imaging lens 5 mounted firm.

Dispose cover 6 over lens holder 3, so as respective cuts for coupling 8 are coupled with position setting sections 3a of lens holder 3; also make catch spaces 9 of cover 6 hooked by catches 3b. By so doing, each of second cam surfaces 10c of cover 6 is made to have pressure-contact with the upper surface (the surface at imaging object side) of cam protruding section 10b of lens barrel 4. This will be detailed further, with reference to FIG. 3. FIG. 3 is an illustration showing the image of mutual relationship among the first cam surface of lens holder, the second cam surface of cover and the cam protruding section of lens barrel, in accordance with the present embodiment. Here, lens holder 3 is shown unrolled flat by 360 degrees. So, second cam surfaces 10c in FIG. 3 are disposed at an interval of approximately 120 degrees.

Figure 3:
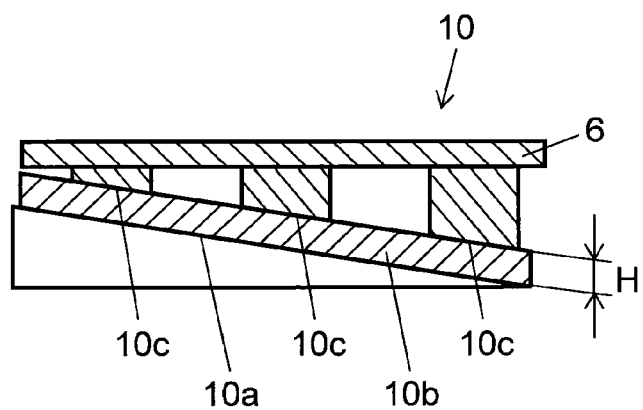
FIG. 3 illustrates an image of mutual relationship among the first cam surface of lens holder, the second cam surface of cover and the cam protruding section of lens barrel.

As shown in FIG. 3, the size of gap H between second cam surface 10c and first cam surface 10a is designed to be slightly smaller than width of cam protruding section 10b, and is kept always to be the same corresponding to the tapering cam protruding section 10b. Cam protruding section 10b of lens barrel 4 moves along gap H; so, lens barrel 4 moves smoothly in the optical axis direction maintaining a stable status. Thus the focus adjusting can be carried out easily. Cover 6 is made with a resin or the like material having an elastic property. So, the cover not only absorbs the dimensional errors regarding the gap H and the width of cam protruding section 10b but it also works to prevent occurrence of rattling in cam mechanism section 10.

Next, description is made on how the imaging apparatus operates. When lens barrel 4 is turned around the optical axis, cam protruding section 10b of lens barrel 4 moves along the undulation of first cam surface 10a; and imaging lens 5 is moved in the optical axis direction by such turning.

The number and the shape of first cam surface 10a, cam protruding section 10b and second cam surface 10c of the above-described cam mechanism section 10 are not limited to those illustrated in the above; but these may be provided optionally at different numbers or modified designs. The points is that the gap H between first cam surface 10a and second cam surface 10c has be provided at a size that is slightly smaller than width of cam protruding section 10b and that such gap is kept constant at the same size corresponding to the taped cam protruding section 10b. In order to ensure the smooth turning of lens barrel 4 around optical axis and the smooth moving in the optical axis direction, however, it is preferred that cam protruding section 10b of lens barrel 4 is pressed from the above by substantially equal pressing forces.

The material to be used for cover 6 is not specified in the above embodiment; the cover may be made with any resin or metal materials in so far as it provides a flexible property. The essential requirement for the material is that second cam surface 10c effectively provides a pressure-contact onto cam protruding section 10b of lens barrel 4.

Further, lens barrel 4 may also be designed so as it can move at the time of picture taking, in order to make it to be compatible with both the close-up (macro) mode and the normal mode (basically, an object at infinity distance is assumed). Practically described; shifting lens barrel 4 towards the imaging object side, for example, creates the macro mode, whereas shifting it towards the imaging element side produces the normal mode. In this case, an operation lever (not shown) may be attached to lens barrel 4 to facilitate easier handling.

As described in the above, an imaging apparatus in the present invention can be assembled by simply inserting the lens barrel in the lens holder along optical axis direction from the leading end section side of the lens holder, and then put on the cover. This signifies reduced assembling steps and improved manufacturing efficiency.

Furthermore, since the second cam surface of cover provides pressure-contact on the cam protruding section of lens barrel, a conventionally-employed elastic component can be eliminated. This means saving of a space in the optical axis direction otherwise needed for a piece component. Saving in the space leads to reduction in the overall dimensions as well as further slimming of an imaging apparatus, which would offer a substantial advantage when designing, for example, a more compact and slimmer portable telephone unit.

INDUSTRIAL APPLICABILITY

An imaging apparatus in the present invention can be easily incorporated as the built-in imaging apparatus in a compact and slim portable telephone unit, personal computer, etc. It is also expected that it finds new application in the sector of TV phone/conference systems.

The invention claimed is:

1. An imaging apparatus comprising a substrate for mounting imaging element on, a lens holder surrounding the imaging element with the inner circumference surface at the substrate side disposed concentric to the imaging element, a lens barrel inserted removably in the lens holder from the leading end section side to be concentric with the imaging element, an imaging lens affixed in the lens barrel for focusing the image of an object on the imaging element, a cover provided detachable to the lens holder having an opening for an end part of the lens barrel, and a cam mechanism arranged on the lens barrel, the lens holder and the cover so as the lens barrel turns around the optical axis with respect to the imaging element and moves in the optical axis direction by such turning; wherein, the cam mechanism is composed of a first cam surface provided in the shape of a link on the inner circumference surface of the lens holder, a cam protruding section produced on the outer circumference surface of the lens barrel so as to move along the first cam surface, and a second cam surface provided on the inner surface of the cover so as to provide such a gap to the first cam surface that is slightly smaller than width of the cam protruding section.

2. The imaging apparatus of claim 1, wherein
the second cam surface is provided at three places with an equal interval among each other.

* * * * *